(12) United States Patent
Dykhoff et al.

(10) Patent No.: US 6,521,834 B1
(45) Date of Patent: Feb. 18, 2003

(54) FIRE STOPPING COVER PLATE FOR FIRE STOPPING ELECTRICAL OUTLETS AND SWITCHES

(75) Inventors: Michael G. Dykhoff, Maplewood, MN (US); Robert J. Boros, Maplewood, MN (US); D. Max Harshbarger, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/648,083

(22) Filed: Aug. 25, 2000

(51) Int. Cl.⁷ .................................................. H02G 3/14
(52) U.S. Cl. ........................... 174/66; 174/67; 220/241; 220/242; 439/138
(58) Field of Search ...................... 174/66, 67; 220/241, 220/242; D8/353, 350–352; D13/177; 439/138; 312/328, 329; 52/232

(56) References Cited

U.S. PATENT DOCUMENTS

| | | | |
|---|---|---|---|
| 3,622,029 A | * 11/1971 | Ware | 220/3.7 |
| 3,795,524 A | 3/1974 | Sowman | |
| 3,995,102 A | 11/1976 | Kohaut | |
| 4,163,137 A | * 7/1979 | Close, Jr. | 220/242 X |
| 4,293,173 A | * 10/1981 | Tricca | 439/138 |
| 4,447,484 A | 5/1984 | Slosberg et al. | |
| 4,496,790 A | * 1/1985 | Spencer | 174/48 |
| 4,504,103 A | 3/1985 | Woedl | |
| 4,521,333 A | 6/1985 | Graham et al. | |
| 4,632,865 A | 12/1986 | Tzur | |
| 4,879,435 A | 11/1989 | Domigan | |
| 5,032,690 A | 7/1991 | Bloom | |
| 5,221,814 A | 6/1993 | Colbaugh et al. | |
| 5,272,278 A | * 12/1993 | Wuertz | 174/48 |
| 5,389,740 A | 2/1995 | Austin | |
| 5,410,103 A | 4/1995 | Wuertz | |
| 5,476,891 A | 12/1995 | Welna | |
| 5,523,059 A | 6/1996 | Langer | |
| 5,763,826 A | 6/1998 | Castellani et al. | |
| 5,830,319 A | 11/1998 | Landin | |
| 5,869,010 A | 2/1999 | Langer | |
| 6,252,167 B1 | * 6/2001 | Rose | 174/66 |

FOREIGN PATENT DOCUMENTS

| | | | | |
|---|---|---|---|---|
| GB | 2264595 | * | 9/1993 | 174/66 |
| JP | 0136013 | * | 5/1990 | 174/66 |
| WO | WO 98/10129 | | 3/1998 | |
| WO | WO 99/38932 | | 8/1999 | |
| WO | WO 99/38933 | | 8/1999 | |

OTHER PUBLICATIONS

Product Data Sheet for Metacaulk® Cover Guard™ (2 pages). No Date.

* cited by examiner

Primary Examiner—Dean A. Reichard
Assistant Examiner—Dhiru R Patel
(74) Attorney, Agent, or Firm—David B. Patchett (57) ABSTRACT

A fire stopping faceplate assembly for an electrical box includes a faceplate having an inner surface, and a fire stopping mat arranged adjacent said faceplate inner surface. The fire stopping mat provides an active system which forms a fire barrier capable of preventing a temperature rise on the wall side opposite the fire by providing an endothermic material which withdraws heat and/or by expanding to provide additional insulating properties and otherwise stopping the spread of fire. The fire stopping mat may include an intumescent compound, an endothermic compound, or both an intumescent compound and an endothermic compound. The fire stopping mat may also include a layer of an infrared blocking material formed of, for example, a metal or a ceramic fiber material.

9 Claims, 3 Drawing Sheets

FIRE STOPPING COVER PLATE FOR FIRE STOPPING ELECTRICAL OUTLETS AND SWITCHES

FIELD OF THE INVENTION

The present invention relates generally to fire stopping devices and, more particularly, to a cover plate for electrical outlets, switches, or the like which includes a fire stopping mat arranged on the inside surface of the cover plate which serves to form a fire barrier in the event of a fire.

BACKGROUND OF THE INVENTION

One mechanism by which fire may spread from one compartment of a structure to another is through passages in the walls. Such passages or through-penetrations include electrical outlets, electrical switches, and the like. Current methods used to prevent the spread of fire and passage of smoke through such openings include providing intumescent compound either on the outside of the outlet or switch box, or on the inside surface of the back wall of the box.

While providing intumescent compound on the outside of the outlet or switch box is generally satisfactory for resisting the spread of fire and preventing the passage of smoke from one compartment to another, this technique has certain drawbacks. For example, to arrange intumescent compound on the outside of the box, the compound must be installed during the framing of the structure because retrofitting the intumescent compound on the outside of the box is difficult, costly, and requires the wall structure to be torn apart. Providing the intumescent compound on the inside of the back surface of the box also has certain drawbacks and disadvantages, most notably, that the intumescent compound must be installed by a licensed electrician.

In addition, providing an intumescent mat on the inside surface of the faceplate allows electrical boxes such as electrical outlets, switches, and the like to be quickly and easily inspected to determine whether the electrical box has been properly fire stopped.

Techniques for insulating electrical outlets are known in the prior art. The U.S. Pat. No. 4,293,173 to Tricca for example, discloses a thermal insulation system for electrical outlets. The system includes a large plate of thermal insulation which is secured behind the faceplate of the outlet, smaller plates of thermal insulation which are placed over the receptacles of the electrical outlets, and dummy plugs which are used to seal the slots of the receptacles and hold the small insulation plates in position. The thermal insulation plates are constructed of a thermal insulating material, such as a resilient closed cell foam material, having low thermal conductivity, and good compressibility and resilience.

The U.S. Pat. No. 4,447,484 to Slosberg et al discloses a flame resistant vinyl-foam gasket material for use as an insulating draft shield in electrical outlets and switch boxes. The gasket material comprises a layer of a flexible vinyl-foam sheet material suitable for use as a gasket material, and a dimensionally stable glass-fiber tissue sheet material integrally positioned and secured within the foam layer.

The insulating articles described in these patents, however, serve only to prevent air infiltration though electrical outlets and switches, thereby conserving energy and increasing the thermal efficiency of buildings. They do not expand when exposed to a fire and are not intended to create a fire barrier.

Accordingly, there exists a need in the industry for a fire stopping mat which can be positioned on the inside surface of a faceplate adapted for mounting on an electrical box which is capable of resisting the spread of fire through the electrical box. It would therefore be desirable to provide a faceplate for an electrical outlet or switch box which includes a fire stopping mat capable of resisting the spread of fire through the outlet or switch box.

SUMMARY OF THE INVENTION

The present invention provides a fire stopping faceplate assembly for an electrical box comprising a faceplate having an inner surface, and a fire stopping mat arranged adjacent the faceplate inner surface. The fire stopping mat provides an active system which forms a fire barrier capable of preventing an excessive temperature rise on the wall side opposite the fire by providing either an intumescent compound which expands to provide additional insulating properties and otherwise stops the spread of fire, smoke and hot gases, by providing an endothermic compound which withdraws heat from the system, or both. By an active system, it is meant that the fire stopping mat undergoes a physical change when exposed to fire-like conditions, and the physical change enhances the thermal characteristics of the fire stopping mat, thereby allowing it to more effectively stop the spread of fire and prevent temperature rise on the wall side opposite the fire. In one aspect of the invention, the fire stopping mat has an activation temperature of no greater than 365° F. (185° C.).

The fire stopping mat may include an intumescent compound, an endothermic compound, or both an intumescent compound and an endothermic compound. Alternatively, the fire stopping mat may comprise a layer formed integrally with the faceplate or may be applied to the faceplate as a coating. In addition, the fire stopping mat may include a layer of an infrared blocking material formed of, for example, a metal or a ceramic fiber material. The fire stopping mat preferably has a thickness of no greater than about 3/16 inches so that it can be positioned within faceplates used to cover conventional electrical outlets and switches.

In another aspect of the invention, the fire stopping faceplate assembly provides fire stopping performance such that a wall including an electrical box with the fire stopping faceplate assembly can achieve fire and temperature ratings when tested according to the test method for fire tests of through-penetration fire stops set forth in ASTM E119 sufficient to pass a test for a time period of at least one hour.

In a specific embodiment, the invention provides a fire stopping faceplate assembly adapted to cover an electrical box mounted in a wall. The assembly includes a faceplate having an inner surface and a fire stopping mat having an activation temperature of no greater than 365° F. (185° C.) arranged adjacent the inner surface of the faceplate. The fire stopping faceplate may include a fire stopping mat formed of a plurality of layers. The layers may include a layer of intumescent compound, a layer of endothermic compound, and a layer of an infrared blocking material arranged adjacent said faceplate inner surface. In one embodiment, the infrared blocking material is formed of a ceramic fiber material. In a specific embodiment of the invention, the layer of infrared blocking material is arranged adjacent the faceplate inner surface, the layer of endothermic compound is arranged adjacent the layer of infrared blocking material, and the layer of intumescent compound is arranged adjacent the layer of endothermic compound.

In yet another embodiment, the fire stopping faceplate includes a fire stopping mat including a moldable putty which may include an intumescent compound.

The fire stopping mat generally has a density of at least about 30 lbs/ft³ in its pre-expanded state, that is, prior to being exposed to fire-like conditions, preferably at least about 40 lbs/ft³, more preferably at least about 50 lbs/ft³, and most preferably at least about 60 lbs/ft³.

In another embodiment, the faceplate is formed of a metal, and the faceplate provides a fire stop which allows a wall including an electrical box having the metal fire stopping faceplate to pass the test method for fire tests of through-penetration fire stops set forth in ASTM E119 for a time period of at least two hours.

In another embodiment, the faceplate is formed of a synthetic polymeric material, and the faceplate provides a fire stop which allows a wall including an electrical box having the synthetic polymeric fire stopping faceplate to pass the test method for fire tests of through-penetration fire stops set forth in ASTM E119 for a time period of at least one hour.

In another aspect, the present invention provides a fire stopping faceplate assembly for fire stopping an outlet or switch mounted in a wall wherein the fire stopping faceplate assembly includes a faceplate having an inner surface and a fire stopping mat arranged adjacent said faceplate inner surface, wherein the fire stopping mat has a sufficiently low activation temperature to allow a wall including an electrical box having the fire stopping faceplate to pass the test method for fire tests of through-penetration fire stops set forth in ASTM E119 for a time period of at least one hour.

In yet another aspect, the present invention provides a fire stopping mat which can be positioned on the inside surface of an electrical box faceplate, wherein the mat includes at least one of an intumescent compound and an endothermic compound and provides fire stopping properties sufficient to pass the test method for fire tests of through-penetration fire stops set forth in ASTM E119 for a time period of at least one hour. The mat may include an intumescent compound, an endothermic compound, and an infrared radiation blocking material.

In another aspect, the present invention provides a method of fire stopping a through-penetration in a wall including an electrical box with a faceplate comprising the steps of providing a fire stopping mat on the inside surface of the faceplate. The fire stopping mat may include an infrared blocking material and at least one of an intumescent compound and an endothermic compound. In addition, the fire stopping mat may have an activation temperature of not greater than 365° F. (185° C.) and a thickness of not greater than 3/16 inches.

BRIEF DESCRIPTION OF THE DRAWINGS

The present invention will be further described with reference to the accompanying drawings, in which.

DETAILED DESCRIPTION

For the purpose of this invention, the following terms are used herein:

"fire stopping mat" refers to an article whose fire stopping properties are enhanced when exposed to temperatures typical of those encountered during a fire, thereby forming a fire barrier capable of resisting the spread of fire and smoke;

"activation temperature" refers to the temperature at which an intumescent compound begins to expand or the temperature at which an endothermic compound begins to change phase, decompose, or react, thereby absorbing heat;

"endothermic compound" refers to a material that absorbs heat, typically by releasing water of hydration, by going through a phase change that absorbs heat (i.e. liquid to gas), or by other chemical change where the reaction requires a net absorption of heat to take place;

"intumescent compound" refers to a compound that expands to at least about 1.5 times its original volume upon heating to temperatures typically encountered in fire-like conditions.

Figure 1:
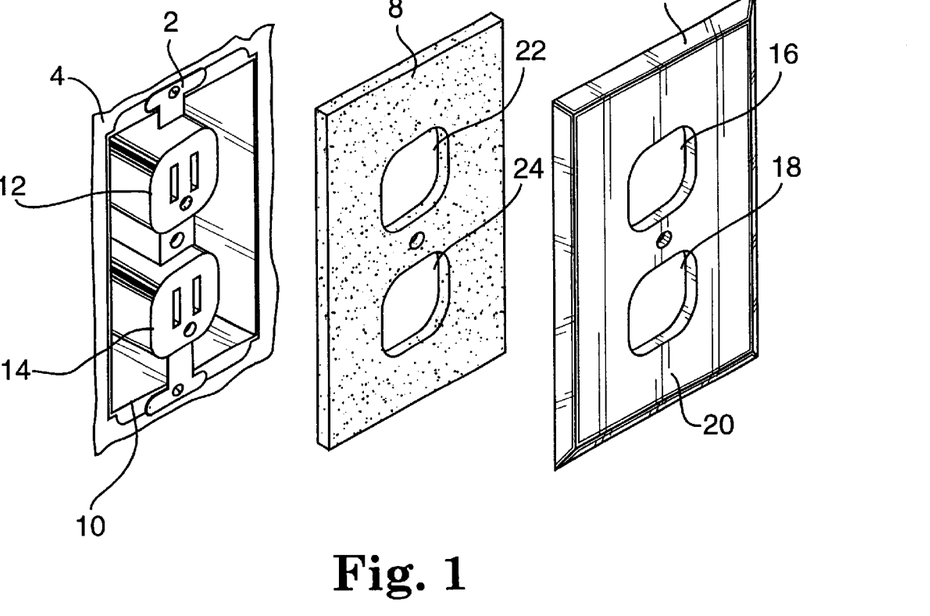
FIG. 1 is an exploded perspective view of an electrical outlet including a faceplate assembly according to the invention.

Referring now to the drawings, wherein like reference numerals refer to like or corresponding parts throughout the several views, FIG. 1 shows an exploded perspective view of a conventional electrical wall outlet 2 mounted in a wall 4, a conventional faceplate 6 adapted to be secured to the outlet 2, and a fire stopping mat 8 adapted for placement between the outlet 2 and faceplate 6. The electrical wall outlet 2 forms an opening in the wall 4 through which fire can spread from one building compartment to another. The outlet 2 includes an electrical box 10 and a pair of sockets 12, 14 arranged in the box 10. A mud ring (not shown) may also be provided between the electrical box 10 and faceplate 6 to extend the depth of the electrical box 10 to ease installation. The electrical box 10 and/or mud ring may be formed of metals or non-metals. Suitable non-metals include, for example, ceramic materials and synthetic polymeric materials such as PVC and phenolic materials. The faceplate 6 includes a pair of openings 16, 18 corresponding to the shape of the sockets 12, 14, respectively, through which the sockets project when the faceplate 6 is installed on the outlet 2. The faceplate 6 may be formed of any suitable material including synthetic plastic materials, such as PVC plastic, or metals.

In accordance with a characterizing feature of the invention, the fire stopping mat 8 is arranged on the inner surface 20 of the faceplate 6 to provide a fire barrier which resists the spread of fire through the wall 4 via the opening created therein by the outlet 2. The fire stopping mat 8 includes a pair of openings 22, 24 corresponding to the shape of the sockets 12, 14, respectively, through which the sockets project when the faceplate 6 and fire stopping mat 8 are installed on the outlet 2.

Figure 2:
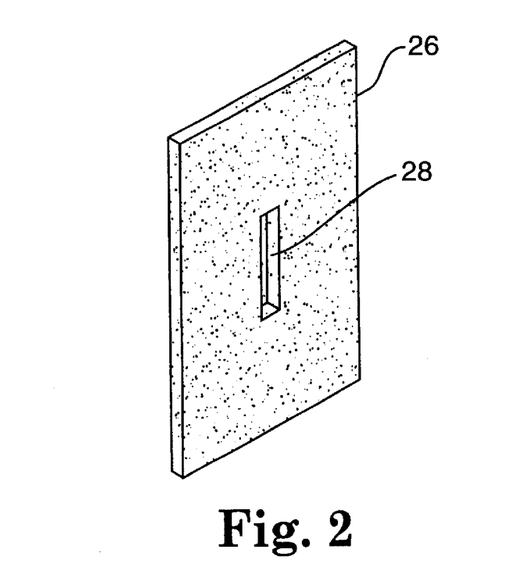
FIG. 2 is a perspective view of a fire stop mat adapted for use with a faceplate for a switch.

FIG. 2 is a perspective view of a fire stopping mat 26 adapted for use with the faceplate for a conventional electrical switch. The fire stopping mat 26 contains an opening 28 which allows for the projection of an electrical switch there through.

Figure 3:
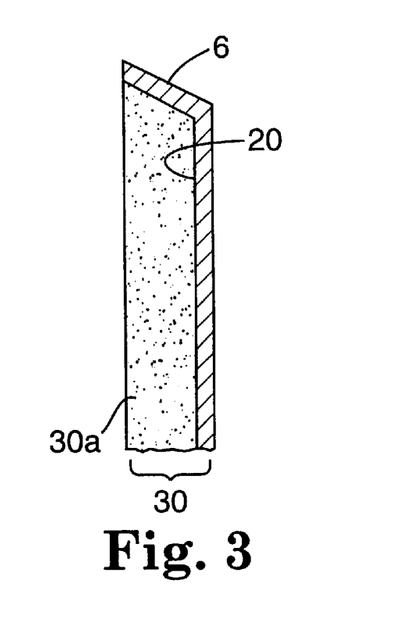
FIG. 3 is a cross-sectional view of a faceplate with a fire stopping mat.

FIGS. 3–7 are cross-sectional side views illustrating a faceplate 6 including various constructions of the fire stopping mat 30 in accordance with the present invention. In FIG. 3, the fire stopping mat 30 comprises a single layer of fire stopping material 30a. The layer of material 30a can be a layer of intumescent compound, a layer of endothermic compound, or a layer formed of a combination of intumescent and endothermic compounds mixed to form a homogeneous mass. Each of these compounds is discussed more fully below. In addition, the fire stopping mat 30 may be provided as a sheet of material or as a pliable putty-like material which can be pressed and formed against the inside surface 20 of the faceplate 6. The putty-like material may include and intumescent compound, an endothermic compound, or both. Suitable putty-like fire barrier compounds are disclosed in the U.S. Pat. No. 5,578,671 to Welna and U.S. Pat. No. 5,175,197 to Gestner et al. A preferred putty is available from Minnesota Mining and Manufacturing Company, St. Paul, Minn., under the trade designation 3M Fire Barrier Moldable Putty which has an activation temperature of 225° F. (107° C.) and a density ranging from 60–82 lbs/ft$^3$.

Figure 4:
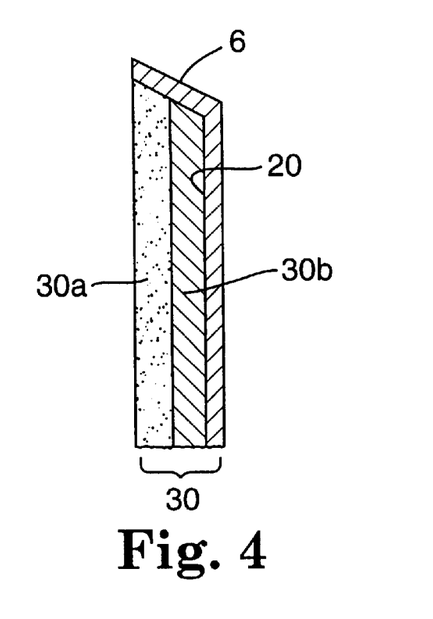
FIG. 4 is a cross-sectional view of a second embodiment of the invention.

In FIG. 4, the fire stopping mat 30 includes a layer of endothermic compound 30b arranged adjacent the inside surface 20 of the faceplate 6 and a separate discrete layer of intumescent compound 30c arranged adjacent the endothermic compound 30b. Alternatively, the positions of the endothermic compound and intumescent compound may be switched, whereby the intumescent compound 30c would be arranged adjacent the faceplate inner surface 20.

Figure 5:
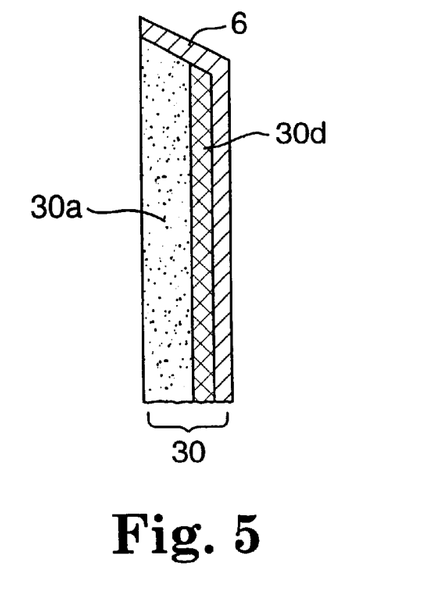
FIG. 5 is a cross-sectional view of a third embodiment of the invention.

In FIG. 5, the fire stopping mat 30 includes a layer of an infrared blocking material 30d arranged adjacent the inner surface 20 of the faceplate 6 and a layer of material 30a arranged adjacent the layer of infrared blocking material 30d. The infrared blocking material 30d is described more fully below. Layer 30a may include an intumescent compound, an endothermic compound, or a mixture thereof as described in reference to FIG. 3. Alternatively, the positions of the infrared blocking material 30d and the layer of material 30a may be switched, whereby the layer 30a would be adjacent the inner surface 20 of the faceplate 6.

Figure 6:
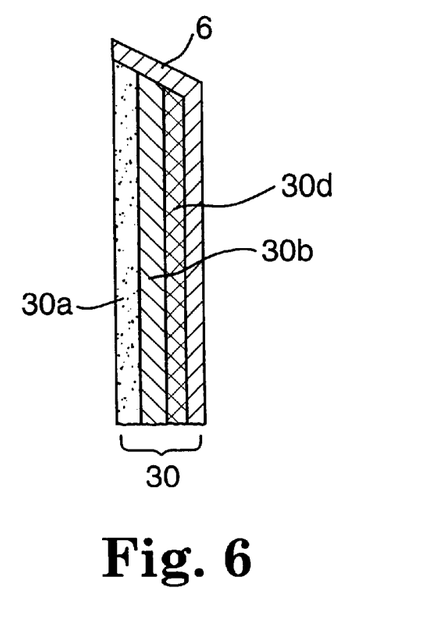
FIG. 6 is a cross-sectional view of a fourth embodiment of the invention.

In FIG. 6, the fire stopping mat 30 includes a layer of infrared blocking material 30d arranged adjacent the inner surface 20 of the faceplate 6, a layer of endothermic compound 30b arranged adjacent the layer of infrared blocking material 30d, and a layer of intumescent compound 30c arranged adjacent the layer of endothermic compound 30b. While it will be recognized that the arrangement of the endothermic layer 30b, intumescent layer 30c, and the infrared blocking layer 30d may be varied, the arrangement illustrated is preferred and has been found to provide the best fire stopping performance.

Figure 7:
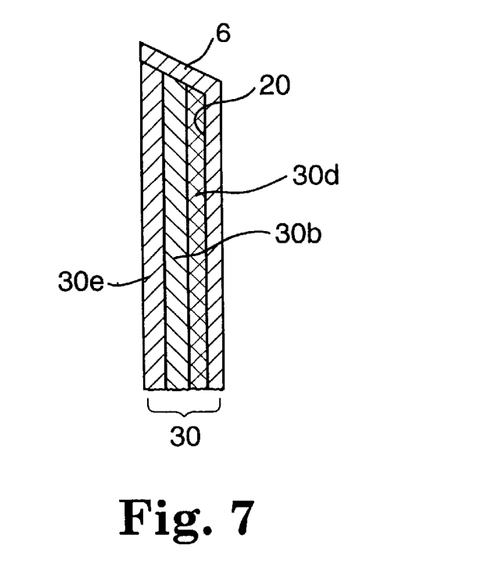
FIG. 7 is a cross-sectional view of a fifth embodiment of the invention.

In FIG. 7, the fire stopping mat 30 includes a layer of infrared blocking material 30d arranged adjacent the inner surface 20 of the faceplate 6, a layer of endothermic compound 30b arranged adjacent the layer of infrared blocking material 30d, and a layer of intumescent putty 30e arranged adjacent the layer of endothermic compound 30b. Again, while it will be recognized that the arrangement of the infrared blocking layer 30d, the endothermic compound 30b, and the intumescent putty 30e may be varied, the arranged illustrated has been found to provide the test fire stopping performance.

In each of the embodiments illustrated in FIGS. 3–7, the fire stopping mat 30 generally has a thickness of no greater than about ¼ inches, and preferably no greater than about ³⁄₁₆ inches, thereby allowing the fire stopping mat to be arranged in the space available between electrical box and faceplate assemblies. In addition, it has been found that the performance of the fire stopping faceplate is enhanced when the activation temperature of the fire stopping mat is less than about 392° F. (200° C.), preferably less than about 365° F. (185° C.), and more preferably less than about 338° F. (170° C.).

As alluded to above, two prominent classes of heat reactive materials used as fire stop materials include intumescent compounds and endothermic compounds. Fire stop materials are constructed by dispersing either an intumescent compound, an endothermic compound, or a mixture of both in the fire stop material. Intumescent compounds are used to expand fire stop materials, thereby reducing the passage of heat, smoke, flames, and/or vapors. Endothermic compounds are used to delay the transfer of heat through the fire stop material, and thereby control the temperature rise across the fire stop material.

The choice of intumescent and endothermic agents is usually based on factors such as cost, degree of intumescence (expansion), endothermic capacity, water solubility, char strength, and aging properties. However, an important and previously unrecognized factor governing the performance of fire stopping materials in the fire stopping of electrical boxes is the activation temperature of the intumescent and endothermic agents.

For example, the temperature at which an intumescent agent activates can significantly affect the fire stopping performance of the material. The temperature at which the intumescent agent activates essentially determines the time at which the fire stop material activates during heating. In general, the sooner the intumescent agent is activated, the less heat, smoke, flames, and/or vapors will be transferred to the non-fire side of a fire stop. In accordance with a characterizing feature of the present invention, a low temperature intumescent compound is utilized to obtain superior ASTM E119 ratings because the intumescent compound activates at a lower temperature and consequently earlier in the course of the test. While not wishing to be limited by theory, it is believed that the increased performance occurs because at the fire side of the wall, the intumescent compound serves to reduce the transmission of heat and hot gases to the internal wall cavity earlier in the test. The internal wall cavity then heats the non-fire side of the wall leading to test failure. In the fire stopping of electrical boxes, a common failure mode involves heating of gas within the wall cavity with leakage through openings in the socket or switch. The leakage occurs before the components within the box have been heated sufficiently to activate the fire stopping materials commonly used in the art.

Several ways have been identified to alter the activation temperature of an intumescent compound. In general, intumescent compounds include an intumescent agent and a fire resistant matrix. Upon activation of the intumescent agent, the agent exerts forces against the fire resistant matrix, thereby leading to an expanded (or intumesced) fire stop material. Three approaches to lowering the activation temperature of the fire stop material include: (1) substituting an intumescent agent into the formulation which inherently lowers the activation temperature; (2) substituting an intumescent agent which generates greater expansion forces at lower temperatures; or (3) decreasing the internal strength of the fire resistant matrix.

The activation temperature of an intumescent agent can differ depending on the chemical nature of the agent or the grade of the intumescent agent. For example, various vermiculite materials are available which have activation temperatures near 600° F. (316° C.), thereby resulting in an activation temperature of the fire stop material of approximately 665° F. (352° C.). It will be noted, however, that the activation temperature of a fire stop material including an intumescent or endothermic agent will be greater than the activation temperature of the intumescent or endothermic agent itself. A preferred intumescent agent is a granular hydrated alkali metal silicate intumescent composition commercially available under the trade designation "EXPANTROL 4BW" from the Minnesota Mining and Manufacturing Company of St. Paul, Minn. which expands over a range of 392 to 1000° F. (200 to 538° C.). Another preferred intumescent agent is interacallated graphite. Depending upon the nature of the intercalated graphite, the activation temperature can range from 320 to 428° F. (160 to 220° C.), thereby resulting in a fire stop material with an activation temperature ranging from 360 to 450° F. (182 to 232° C.). Thus, by selecting individual intumescent agents or mixtures thereof, one can tailor the activation temperature of the intumescent compound.

In addition to the activation temperature of the intumescent agent(s) used in the fire stop material, the activation temperature of the fire stop material will be determined by the intumescent profile of the intumescent agent(s) used. For example, different intumescent agents can be combined to produce dramatic expansion from time of initial activation, but the expansion may end soon after activation. Alternatively, the intumescent agent(s) may be selected to produce modest expansion upon activation, but dramatic expansion later in the process. Thus, both the activation temperature and the expansion profile of the fire stop material can be controlled by selecting appropriate intumescent agent(s). In this manner, the fire stopping characteristics of a particular fire stop material can be tailored to meet specific fire stopping needs and end use applications.

The forces generated by an intumescent agent, often referred to as "expansion pressure", also affect activation temperature. Certain grades of intercalated graphite, for example, have been found to generate significantly higher forces than others. Thus, depending on the pressure and activation temperature profile of the graphite, the activation temperature of the fire stop material can be controlled. Thus, if the fire resistant matrix is held constant, the amount of intumescence at any given temperature will be proportional to the forces generated by the graphite. In addition, it is desirable to select a binder material which has a glass transition temperature which is lower than the activation temperature of the intumescent agent, thereby to facilitate expansion of the fire stopping material.

Another way of controlling the activation temperature of the fire stop material is by reducing the resistance of the fire resistant matrix to internal forces. In much the same way that increasing the forces generated by an intumescent agent, such as graphite, at a given temperature will increase the degree of expansion, decreasing the internal forces of the matrix at any given temperature will also increase the degree of expansion of the intumescent compound.

The resistance to internal forces of a fire stop material can be altered in a number of ways. One way is to increase the concentration of binder in the composition. Binders are often included in fire stop materials to give the fire stop material sufficient integrity to be of practical use. Increasing the concentration will increase the resistance of the material to internal forces and inhibit expansion. Decreasing the concentration of binder will have the converse effect. Furthermore, in rubber compositions, the degree of cross linking will effect the resistance of the matrix material to internal forces, thereby affecting expansion.

It is also important to consider the resistance to internal forces as a function of temperature. The resistance will depend on both temperature and the amount of time the material is exposed to the elevated temperature. For example, it is often desirable to include organic materials in the matrix. Organic materials degrade at elevated temperatures thereby decreasing the resistance to internal forces of the matrix at those temperatures. Refractory materials are other common components of the matrix. Thus, altering the ratio of organic to refractory components will affect the resistance of the matrix material to internal forces. Furthermore, the thermal decomposition of organic materials vary greatly which means that the resistance of the material to internal forces can be further tailored by choice of organic materials.

In addition to the activation temperature of the intumescent agent, the activation temperature of the endothermic agent can dramatically affect the performance of a fire stop material. In practice, the temperature rise across a fire stop is important because it determines the temperature or "T" rating portion of the ASTM E119 test. The use of endothermic agents to absorb heat from the fire, or other sources is know in the art. However, most of the endothermic agents currently in use, such as ATH (aluminum trihydroxide), and zinc borate, activate at temperatures above the failure temperature of ASTM E119 of approximately 400° F. (204° C.), and are therefore of limited value.

The use of endothermic agents which absorb heat below 400° F. (204° C.) is therefore very desirable. Fire stop materials made with such endothermic agents can be placed on the non fire side of a fire stop and absorb heat, thereby preventing the cold side temperature from reaching 400° F. (204° C.). In this manner, combustible materials on the cold side are protected and fire is prevented from spreading from one room to another in a burning building. Preferred endothermic agents and there activation temperatures include: $MgNH_4PO_4.6H_2O$ 185° F. (85° C.), $CaSO_4.4H_2O$ 300° F. (149° C.), and magnesium phosphate $MgHPO_4.3H_2O$ 230° F. (110° C.).

Intumescent Compounds

During heating, an intumescent compound will expand, by physical force, the fire barrier material of the present invention and generate gas. The intumescent compound contributes to the insulating ability of the fire barrier material by increasing the total volume of the fire barrier material and creating a generally tight seal around or between the faceplate and the electrical box. This volume change will make the material more thermally insulating than it was in its originally unfired state. Additionally, endothermic absorption of some thermal energy during this expansion contributes to the overall inhibition of thermal transfer during firing.

As stated above, an intumescent compound is one that expands to at least about 1.5 times its original volume upon heating. The intumescent compound provides for expansion of the fire barrier material of the present invention, in an unconfined state, to at least about 1.5 times the original thickness of the material when exposed to fire-like conditions, preferably at least about three times its original thickness, more preferably, four times its original thickness. For some uses, it is preferable that the fire barrier material expand to at least about nine times its original thickness.

Typical intumescent agents are varied in chemical composition but are recognized by the property of swelling, foaming or otherwise increasing in size as the result of a chemical change resulting in a physical change within the structure of the individual particles of intumescent compound. This change is activated by an increase in temperature (i.e., energy or heat).

Exemplary intumescent compounds include intumescent graphite such as intercalated graphite and acid treated graphite, hydrated alkali metal silicates, vermiculite, perlite, NaBSi, volcanic glass with $CO_2$ blowing agent incorporated within the glass particles, mica, and mixtures thereof.

Preferred intumescent graphite materials include acid intercalated graphite commercially available under the trade name "GRAFGUARD 160" and "GRAFGUARD 220", both from UCAR Carbon of Cleveland, Ohio. Another preferred intumescent agent is a granular hydrated alkali metal silicate intumescent composition commercially available under the trade designation "EXPANTROL 4BW" from the Minnesota Mining and Manufacturing Company of St. Paul, Minn.

Granular hydrated alkali metal silicate intumescent compound commercially available from Minnesota Mining and Manufacturing Company, St. Paul, Minn., under the trade designation "EXPANTROL 4BW" is very dense and has good intumescent properties. Intumescent graphite has excellent intumescent properties and relatively low density compared with the previous two materials.

An intumescent compound contributes to the insulating ability of the fire barrier material by increasing the total thickness of the barrier upon exposure to heat, to the ability of the fire barrier material to absorb thermal energy during a fire, and to the ability of the fire barrier material to create a generally tight seal around construction elements.

Intumescent compounds are described in the Langer U.S. Pat. No. 5,869,010, to Welna U.S. Pat. No. 5,476,891, to Landin U.S. Pat. No. 5,830,319, and to Langer U.S. Pat. No 5,523,059. Suitable intumescent compounds are also described in pending U.S. patent application to Landin Ser. No. 09/016,876, and to Gestner Ser. No. 09/016,879. The composition of a preferred intumescent material having an activation temperature of 365° F. (185° C.) is provided in the following table:

TABLE I

| Ingredient | Weight % (Dry) |
|---|---|
| GRAFGUARD 160 (Intumescent) | 62.1 |
| SOLEM SB36 (Endothermic) | 25.2 |
| AIRFLEX 600BP | 7.4 |
| SANTICIZER 141 | 1.7 |
| Microfiber 106/475 | 1.7 |
| RAYON Fiber 1.5D | 1.7 |
| TAMOL 850 | 0.2 |

Graphite GRAFGUARD 160 is an intumescent graphite available from UCAR Carbon of Cleveland, Ohio which has an activation temperature of 320° F. (160° C.). The particular grade of GRAFGUARD 160 used was 80 N. SOLEM SB36 is an endothermic material available from J.M. Huber Corp., Solem Div., of Norcross, Ga. AIRFLEX 600BP is an acrylate-vinyl acetate-ethylene emulsion binder available from Air Products and Chemicals Inc. of Allentown, Pa., which provides the intumescent compound with improved elasticity properties. SANTICIZER 141 is a plasticizer available from Monsanto of St. Louis, Mo. which serves as a phosphate source for forming char from the RAYON fiber. Microfiber 106/475 is a glass fiber filler available from Schuller International, Defiance, Ohio. RAYON is a cellulosic fiber which contributes to the structural integrity of the charred material after exposure to heat and is available from MiniFiber, Inc. of Johnson City, Tenn. TAMOL 850 is a surfactant available from Rohm & Haas of Philadelphia, Pa. which facilitates the mixing of the AIRFLEX and the SANTICIZER 141.

Endothermic Compounds

As used herein, an endothermic compound is one that absorbs heat, typically by releasing water of hydration, by going through a phase change that absorbs heat (i.e. liquid to gas), or by other chemical change where the reaction requires a net absorption of heat to take place (such as the release of $NH_3$ from $MgNH_4PO_4$).

Suitable endothermic compounds include compounds which thermally decompose, typically with the evolution of one or more small molecules such as ammonia, carbon dioxide, and/or water, which volatilize, or which react with one or more other compounds present within the fire barrier material or the surrounding atmosphere in a manner which provides a net uptake of thermal energy by the system. In cases involving small molecule evolution or substantial volatilization of a constituent of the endothermic compound, some heat may be carried away from the fire barrier material and the items to be protected by the fire barrier material. Solid endothermic compounds may provide separate contributions from each of heat of fusion, heat capacity, heat of vaporization, and thermal energy lost as hot gas leaves the fire barrier material. Preferably, any volatile gas produced by the endothermic compound is not combustible.

Suitable endothermic compounds include inorganic materials which provide endothermic reaction or phase change without exothermic decomposition or combustion between 194 and 2732° F. (90 and 1500° C.). Exemplary compounds include aluminum trihydrate (ATH), $Al(OH)_3$ hydrated zinc borate ($ZnB_2O_4.6H_2O$), calcium sulfate ($CaSO_4.2H_2O$) also known as gypsum, magnesium ammonium phosphate ($MgNH_4PO_4.6H_2O$), magnesium hydroxide ($Mg(OH)_2$), and encapsulated $H_2O$. Preferred endothermic agents include magnesium ammonium phosphate hexahydrate, MgO.2B2O3.9H2O, gypsum, and MgHPO4.3H2O.

The composition of a preferred endothermic material is provided in the following table:

TABLE II

| Ingredient | Weight % (Dry) |
|---|---|
| AIRFLEX 600BP | 21.7 |
| SANTICIZER 141 | 11.8 |
| HOSTAFLAM AP 462 | 2.2 |
| BUDIT 370 | 39.4 |
| Microfiber 106/475 | 1.6 |
| MiniFibers 0.50 inch RAYON | 1.6 |
| MiniFibers 0.25 inch RAYON | 6.9 |
| FIBERFRAX 7000M | 14.8 |

AIRFLEX 600BP is an acrylate-vinyl acetate-ethylene emulsion binder available from Air Products and Chemicals Inc. of Allentown, Pa., which provides the intumescent compound with improved elasticity properties. SANTICIZER 141 is a phosphorus containing flame retardant plasticizer available from Monsanto of St. Louis, Mo. HOSTAFLAM 462 is encapsulated ammonium polyphosphate available from Hoescht Celanese of Dallas, Tex. BUDIT 370 is magnesium ammonium phosphate hexahydrate available from Cometals, Inc. of New York, N.Y. Microfiber 106/475 is a glass fiber filler available from Schuller International, Defiance, Ohio. The RAYON minifibers are cellulosic fibers available from MiniFiber, Inc. of Johnson City, Tenn. FIBERFRAX 7000M is ceramic fiber filler available from Carborundum of Niagara Falls, N.Y. The endothermic material having the composition set forth in Table II has an activation temperature of approximately 194° F. (90° C.).

Infrared Blocking Material

In the design of the fire stopping mat of the present invention, it is often desirable to include an infrared-blocking layer. In a fire a large fraction of the heat transferred to and across a fire stop originates as infrared radiation. Thus, a fire stop which blocks infrared radiation will minimize heat transfer which must be retarded by insulation, endothermic absorption, or other means.

Metal foils have been used as infrared blocking materials to reflect a large amount of infrared radiation. When using these materials, the melting point of the metal must be taken into account so that it does not melt during the course of the fire, thereby allowing infrared radiation to reach the remaining components of the fire stop. Thus, metal with high melting points are preferred. A preferred material is NEXTEL Flamestopping Dot Paper available from Minnesota Mining and Manufacturing Company, St. Paul, Minn. This material and other vitreous materials reflect a large portion of radiation in the infrared spectrum and are thus useful as infrared radiation blockers. Certain examples have the further advantage of melting points above those temperatures found in most fires. Furthermore, their flexibility/drapability is higher than many metal foils.

Binder

As mentioned above, a binder may be used in the present invention. Binders typically comprise a polymeric material and may be in the form of aqueous emulsions (also referred to as "lattices"), aqueous solutions, non-aqueous solutions, or organosols. The term "solution" refers to polymeric materials dissolved in a liquid media, such as water or an organic liquid such as acetone or toluene. Suitable binders may include polymeric materials which may be either thermoplastic or thermosetting. Preferably the binder has significant elastomeric properties, i.e., rubber-like properties, such as conformability and stretch.

"Thermoplastic" materials typically have long polymer chains with few, if any, chemical bonds acting to crosslink the chains. Thermoplastic materials, when heated, normally become soft and moldable and return to their original condition when cooled. Subsequent reheating serves to resoften the material. Examples of thermoplastic materials include substantially linear polymers such as acrylate polymers, natural rubbers, polychloroprene, styrene butadiene copolymers, butadiene acrylonitrile copolymers, polyisoprene, polybutadiene, polyvinyl chloride, polyvinyl acetate, polyethylene terephthalate, polyethylene, polypropylene, polystyrene, and combinations and mixtures of these polymers. The term "substantially linear" as used with reference to these materials refers to a preference for no more than three or four branches on average per polymer chain, preferably one or two, and most preferably zero.

"Thermoset" materials refer to polymers which undergo crosslinking reactions and thus cure or "set", typically upon heating. If the crosslinking is sufficiently high, the material tends to be hard, infusible, and insoluble. Such materials typically cannot be subsequently permanently changed if warmed. Two or more liquid components can be reacted to form a thermoset polymer; for example, a multifunctional amine and a multifunctional epoxy may be reacted to form an epoxy system. Examples of suitable thermoset materials include epoxies, polyurethanes, polyimides and the like. In addition, suitable thermoset materials include thermoplastic materials capable of being crosslinked with the addition of a crosslinking agent, for example, natural rubber, polychloroprene, styrene butadiene copolymers, butadiene acrylonitrile copolymers, and polybutadiene.

Preferably, the binder is in the form of a latex, i.e., a colloidal suspension of polymer in water which can be coagulated or precipitated out of suspension by an abrupt pH change or other event causing ionic charge disruption of the colloidal structure. More preferably, the latex enhances the flame-retardance of the fire barrier material. Suitable lattices include halogenated and non-halogenated lattices. Typically, these lattices are commercially available as an aqueous dispersion. Suitable polymers include, for example, acrylate and methacrylate polymers and copolymers, polybutadiene and polybutadiene acrylate, natural rubbers, styrene butadiene copolymers, butadiene acrylonitrile copolymers, urethane elastomers, polyvinylidene fluoride, silicone, polyamide, polyisoprene, polychloroprene, and polybutadiene. Preferred latex binders include an acrylate polymer, which is commercially available under the trade designation "RHOPLEX HA-8" from Rohm and Haas Co. of Philadelphia, Pa., and an ethylene/vinyl acetate/acrylate terpolymer, which is commercially available under the trade designation "AIRFLEX 600BP" from Air Products and Chemicals, Inc. of Allentown, Pa.

Optional Additives

Optional additives may be included to add or enhance properties of the fire barrier material and may include fillers, pigments, fire retardants, antiseptic materials such as fungicides and bactericides. and processing aids.

Fillers may be included to add reinforcement, adjust the stiffness, alter the handleability, or produce other desirable characteristics of the fire barrier material either before or after exposure to heat and flame. Exemplary fillers include fumed silica, clay, fly ash, perlite, vermiculite, glass powders or frits, sodium aluminates, zinc borate, and boric oxide. Some of these refractory materials (i.e., oxides, borates, and glass and ceramic materials) may contribute to the fire barrier or fire retardant properties of the fire barrier material; such are preferred fillers.

Pigments may be useful as an identification aid for the product. Exemplary pigments and colorants include iron oxides, titanium dioxide (e.g., rutile), carbon black, and synthetic organic pigments and dyes (e.g., FD&C Blue #1).

EXAMPLES

In order that the invention described herein can be more fully understood, the following examples are set forth. It should be understood that these examples are for illustrative purposes only, and are not to be construed as limiting this invention in any manner.

Figure 8:
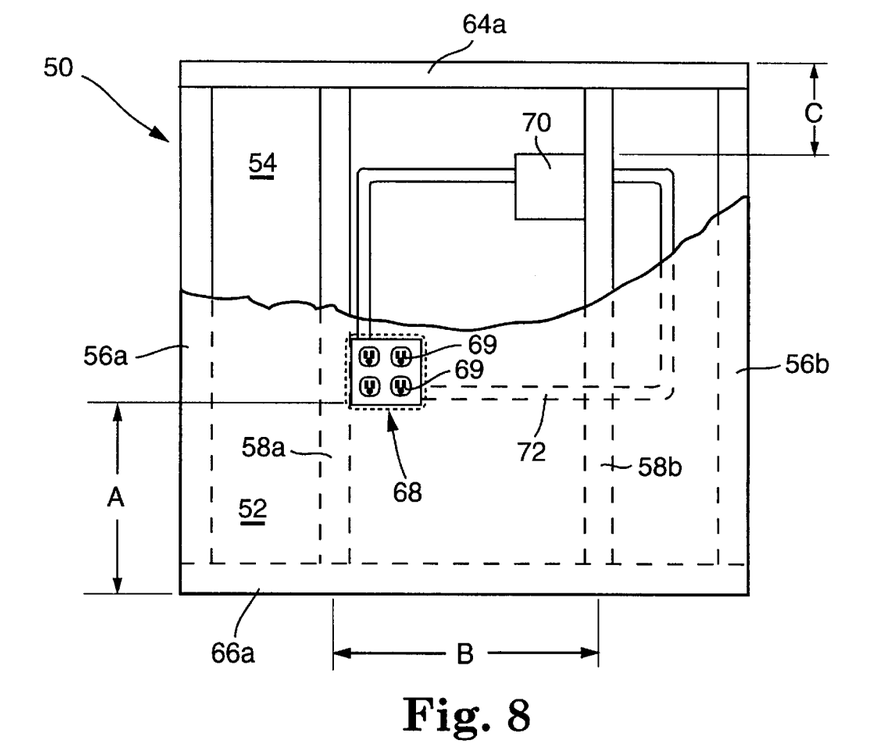
FIG. 8 is a partially cut-away front view of the test setup used to evaluate the fire stopping performance of the invention.
Figure 9:
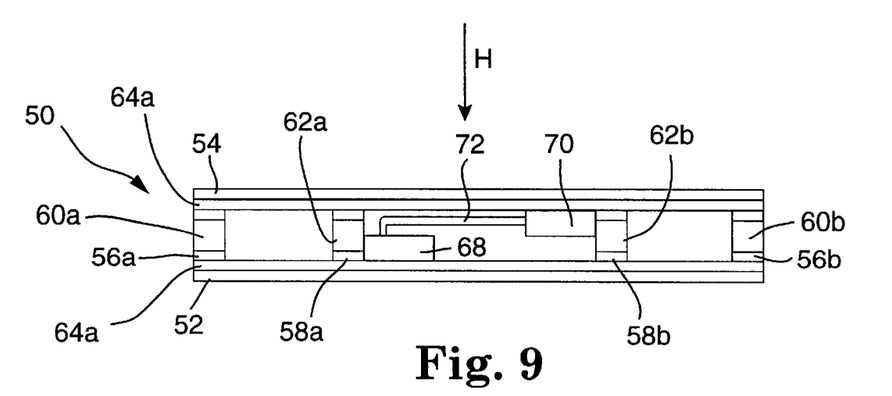
FIG. 9 is a top view of the test setup used to evaluate the fire stopping performance of the invention.

To evaluate the fire stopping performance of the fire stopping faceplate of the present invention, tests were conducted as described in ASTM E 119 "Standard Test Methods for Fire Tests of Building Construction and Materials." Referring to FIGS. 8 and 9, there is shown a typical test setup used to conduct the tests. The test setup includes a wall assembly 50 constructed of front and rear wallboard members 52, 54, respectively, outer vertical support studs 56a, 56b, inner vertical support studs 58a, 58b, outer horizontal support studs 60a, 60b, and inner horizontal support studs 62a, 62b extending between the wallboard members 52, 54, and upper horizontal framing members 64a and lower horizontal framing members 66a. An electrical outlet box 68 containing receptacles 69 is mounted in the wall 50 and is connected with a 4×4×3 inch box 70 via a three conductor cable 72. Other details of the test setup and procedure can be found by referring to the ASTM test method ASTM E 119 "Standard Test Methods for Fire Tests of Building Construction and Materials." During the test, rear wallboard member 54 was exposed to a heat source H as indicated by the arrow.

Example 1

A 4×4×3 inch U.L. listed metal electrical box with a metal faceplate was tested. The wall was constructed pursuant to the U 300 rated wall assemblies with wood studs and one layer of ⅝ inch type X fire rated gypsum. The arrangement of the components are indicated by the letters A, B, and C which correspond to the following dimensions: A=12 inches, B=16 inches, and C=6 inches. The faceplate included a fire stopping mat arranged on the inner surface of the faceplate (i.e. on the surface facing the electrical box). The fire stopping mat was formed of a ⅛ inch thick layer of Interam Graphite Mat (Ultra GS) intumescent compound available from Minnesota Mining and Manufacturing Company, St. Paul, Minn. Interam Graphite Mat (Ultra GS) intumescent compound has an activation temperature of 455° F. (235° C.) and a density of 70 lbs/ft³. The electrical box assembly was then tested according to ASTM test method ASTM E 119 using the test setup described above to evaluate its fire stopping performance. This electrical box assembly achieved fire and temperature ratings of greater than sixty minutes.

Example 2

A 4×4×3 inch U. L. listed metal electrical box with a metal faceplate was tested. The wall was constructed pursuant to the U 400 rated wall assemblies with steel studs and two layers of ⅝ inch type X fire rated gypsum. The arrangement of the components are indicated by the letters A, B, and C which correspond to the following dimensions: A=12 inches, B=24 inches, and C=6 inches. The faceplate included a fire stopping mat arranged on the inner surface of the faceplate (i.e. on the surface facing the electrical box). The fire stopping mat was formed of a ⅛ inch thick layer of an intumescent compound having the composition set forth in Table I. The composition has an activation temperature of 365° F. (185° C.) and a density of 70 lbs/ft³. This electrical box assembly achieved fire and temperature ratings of greater than 100 minutes.

Example 3

A 4×4×3 inch U.L. listed metal electrical box with a metal faceplate was tested. The wall was constructed pursuant to the U 400 rated wall assemblies with steel studs and two layers of ⅝ inch type X fire rated gypsum. The arrangement of the components are indicated by the letters A, B, and C which correspond to the following dimensions: A=12 inches, B=24 inches, and C=6 inches. The faceplate included a fire stopping mat arranged on the inner surface of the faceplate (i.e. on the surface facing the electrical box). The fire stopping mat included an infrared blocking layer formed of NEXTEL Flamestopping Dot Paper available from Minnesota Mining and Manufacturing Company, St. Paul, Minn. arranged adjacent the faceplate, a 1/16 inch thick layer of endothermic material having a composition as set forth in Table II arranged adjacent the infrared blocking layer, and a ⅛ inch thick intumescent layer having the composition set forth in Table I arranged adjacent the endothermic layer. This electrical box assembly achieved fire and temperature ratings of greater than 120 minutes.

Example 4

A 4×4×3 inch U.L. listed metal electrical box with a plastic faceplate was tested. The wall was constructed pursuant to the U 400 rated wall assemblies with steel studs and two layers of ⅝ inch type X fire rated gypsum. The arrangement of the components are indicated by the letters A, B, and C which correspond to the following dimensions: A=12 inches, B=24 inches, and C=6 inches. The faceplate included a fire stopping mat arranged on the inner surface of the faceplate (i.e. on the surface facing the electrical box). The fire stopping mat included an infrared blocking layer formed of NEXTEL Flamestopping Dot Paper arranged adjacent the faceplate, a 1/16 inch thick layer of endothermic material having a composition as set forth in Table II arranged adjacent the infrared blocking layer, and a ⅛ inch thick layer of 3M Fire Barrier Moldable Putty arranged adjacent the endothermic layer. This electrical box assembly achieved fire and temperature ratings of greater than 120 minutes.

Example 5

A 4×4×3 inch phenolic electrical box with a metal faceplate was tested. The wall was constructed pursuant to the U 400 rated wall assemblies with steel studs and two layers of ⅝ inch type X fire rated gypsum. The arrangement of the components are indicated by the letters A, B, and C which correspond to the following dimensions: A=12 inches, B=24 inches, and C=6 inches. The faceplate included a fire stopping mat arranged on the inner surface of the faceplate (i.e. on the surface facing the electrical box). The fire stopping mat included an infrared blocking layer formed of NEXTEL Flamestopping Dot Paper arranged adjacent the faceplate, a 1/16 inch thick layer of endothermic material having a composition as set forth in Table II arranged adjacent the infrared blocking layer, and a ⅛ inch thick layer of 3M Fire Barrier Moldable Putty arranged adjacent the endothermic layer. This electrical box assembly achieved fire and temperature ratings of greater than 110 minutes.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A fire stopping faceplate assembly for an electrical box comprising:
   (a) a faceplate having an inner surface; and
   (b) a fire stopping mat arranged adjacent said faceplate inner surface including an intumescent compound and a layer of an infrared blocking material.

2. A fire stopping faceplate assembly as defined in claim 1, wherein said fire stopping mat further includes an edothermic compound.

3. A fire stopping faceplate assembly as defined in claim 1, wherein a wall assembly including an electrical box having said fire stopping faceplate assembly can pass the test method for Fire Tests of Building Construction and Materials set forth in ASTM E 119 for a time period of at least one hour.

4. A fire stopping faceplate assembly adapted to cover an electrical box mounted in a wall, comprising:
   (a) a faceplate having an inner surface;
   (b) a fire stopping mat arranged adjacent said faceplate inner surface, said fire stopping mat comprising a plurality of layers wherein one of said layers comprises an infrared blocking material arranged adjacent said faceplate inner surface.

5. A fire stopping faceplate as defined in claim 4, wherein said infrared blocking material is formed of a ceramic fiber material.

6. A fire stopping faceplate as defined in claim 4, wherein one of said layers comprises a layer of an endothermic compound arranged adjacent said infrared blocking material.

7. A fire stopping faceplate assembly adapted to cover an electrical box mounted in a wall, comprising:
   (a) a faceplate having an inner surface;
   (b) a fire stopping mat arranged adjacent said faceplate inner surface, said fire stopping mat comprising a plurality of layers wherein one of said layers comprises an infrared blocking material arranged adjacent said faceplate inner surface and one of said layers comprises a layer of intumescent compound arranged adjacent said infrared blocking material.

8. A fire stopping faceplate for fire stopping an outlet or switch mounted in a wall, comprising:
   (a) a faceplate formed of a metal, said faceplate having an inner surface, and said faceplate being adapted for mounting on the wall; and
   (b) a fire stopping mat arranged adjacent said faceplate inner surface, said fire stopping mat having a thickness of no greater than about 3/16 inches, said fire stopping mat including
      (1) a layer of infrared radiation blocking material arranged adjacent said faceplate inner surface;
      (2) a layer of an endothermic compound arranged adjacent said layer of infrared blocking material; and
      (3) a layer of intumescent compound arranged adjacent said layer of endothermic compound.

9. A method of fire stopping a fire rated wall assembly including an electrical box with a faceplate comprising the steps of providing a fire stopping mat on the inside surface of the faceplate, wherein said fire stopping mat includes an infrared blocking material and at least one of an intumescent compound and an endothermic compound.

* * * * *